US012087152B1

(12) United States Patent
Buentello et al.

(10) Patent No.: US 12,087,152 B1
(45) Date of Patent: Sep. 10, 2024

(54) SMART HOME HAZARD NOTIFICATION SYSTEM

(71) Applicant: United Services Automobile Association (USAA), San Antonio, TX (US)

(72) Inventors: Andre Rene Buentello, San Antonio, TX (US); Nathan Lee Post, Rockport, TX (US); Justin Royell Nash, Little Elm, TX (US); Gregory David Hansen, San Antonio, TX (US); Jose L. Romero, Jr., San Antonio, TX (US); Brian Francisco Shipley, Plano, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 84 days.

(21) Appl. No.: 17/955,274

(22) Filed: Sep. 28, 2022

Related U.S. Application Data

(60) Provisional application No. 63/250,744, filed on Sep. 30, 2021.

(51) Int. Cl.
*G08B 5/36* (2006.01)
*G08B 21/12* (2006.01)

(52) U.S. Cl.
CPC ............... *G08B 5/36* (2013.01); *G08B 21/12* (2013.01)

(58) Field of Classification Search
CPC . G08B 5/36; G08B 21/12; E04F 15/02; E04F 13/074; E04F 19/02; E04F 19/04; E04F 2290/02; E04F 19/0436; E04F 15/105; E04F 15/107; E04F 2019/044; E04B 5/43; G01D 11/245; G21F 7/02; F24F 2120/10; H02G 3/36
USPC .............. 340/815.47, 815.4, 815.43, 815.49, 340/815.53, 815.56
See application file for complete search history.

(56) References Cited

U.S. PATENT DOCUMENTS

| | | | | |
|---|---|---|---|---|
| 9,983,011 | B2 * | 5/2018 | Mountain | G08B 7/066 |
| 10,954,677 | B1 * | 3/2021 | Scanlin | E04F 19/04 |
| 2004/0012951 | A1 * | 1/2004 | Pylkki | G08B 7/062 362/276 |
| 2018/0047106 | A1 * | 2/2018 | Snyder | G06Q 30/0645 |
| 2019/0086275 | A1 * | 3/2019 | Kumar | G01K 1/02 |

* cited by examiner

*Primary Examiner* — Anh V La
(74) *Attorney, Agent, or Firm* — Fletcher Yoder, P.C.

(57) ABSTRACT

A system includes a building that has a wall that is at least partially covered in a smart paint. The system also includes a sensor that is configured to collect sensor data regarding a condition within the building. The system additionally includes a controller that is operatively coupled to the wall and the smart paint. The controller is configured to receive the sensor data from the sensor, determine whether the condition is present based on the sensor data, and in response to determining the condition is present, cause the smart paint to provide an indication that the condition is present.

20 Claims, 4 Drawing Sheets

SMART HOME HAZARD NOTIFICATION SYSTEM

CROSS-REFERENCE TO RELATED APPLICATIONS

The present application claims priority to and benefit of U.S. Provisional Patent Application No. 63/250,744, entitled "SMART HOME HAZARD NOTIFICATION SYSTEM," which was filed on Sep. 30, 2021, and which is herein incorporated by reference in its entirety for all purposes.

BACKGROUND

The present disclosure relates generally to environmental monitoring and/or action within an environment using smart coatings, such as smart paints.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a system includes a building that has a wall that is at least partially covered in a smart paint. The system also includes a sensor that is configured to collect sensor data regarding a condition within the building. The system additionally includes a controller that is operatively coupled to the wall and the smart paint. The controller is configured to receive the sensor data from the sensor, determine whether the condition is present based on the sensor data, and in response to determining the condition is present, cause the smart paint to provide an indication that the condition is present.

In another embodiment, a computer-implemented method includes receiving, via processing circuitry sensor data regarding a condition within a building from a sensor. The method also includes determining, via the processing circuitry and based on the sensor data, that the condition is present. Furthermore, in response to determining the condition is present, the method includes causing, via the processing circuitry, smart paint that at least partially covers a wall of the building to provide an indication that the condition is present.

In yet another embodiment, a tangible, non-transitory computer-readable medium comprising instructions that, when executed by processing circuitry, cause the processing circuitry to receive sensor data regarding a condition within a building from a sensor, determine, based on the sensor data, whether the condition is present, and, in response to determining the condition is present, cause smart paint that at least partially covers a surface of the building to provide an indication that the condition is present.

BRIEF DESCRIPTION OF THE DRAWINGS

Various aspects of this disclosure may be better understood upon reading the following detailed description and upon reference to the drawings in which.

Detailed Description of Specific Embodiments

Figure 1:
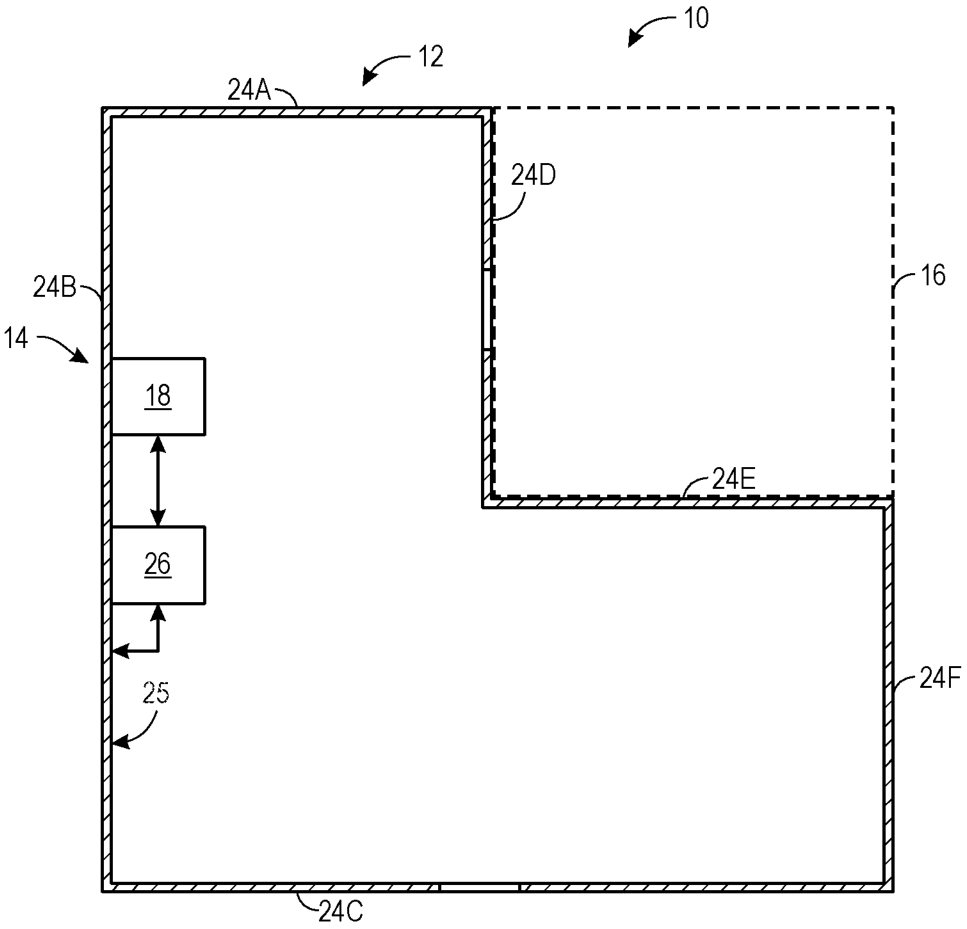
FIG. 1 is a block diagram of a system that includes a controller that can control smart paint on walls of a building to indicate the presence of a condition on a property, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device" and "computing device" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, a keyboard, a video camera or other image or motion capture device, a remote motion capture system, and a wearable motion capture system. Furthermore, in the exemplary embodiment, additional output channels may include, but are not be limited to, an operator interface monitor, a heads-up display, tactile output system, and/or an acoustic output system. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The present disclosure relates generally to several techniques that utilize smart coatings (e.g., paint) to provide indications (e.g., visually) to occupants or people present within a building to a condition that is detected to be present in the building. For example, as discussed below, a controller may detect the presence of the condition (e.g., fire, carbon monoxide, water leak, gas leak) based on sensor data the controller receives. Additionally, the controller may cause an electric current to be applied to the smart coating to indicate to the occupants that the condition is present or how to respond to the condition. For example, the indication may visually indicate the location of an exit that occupants should use to leave the building due to the condition being present.

As another example, the controller may activate the smart coating in response to user input to do so. For instance, a user may want to know the location(s) of the smart coating or the location(s) of one or more objects (e.g., studs, wires, pipes) located inside of a wall. In response to receiving user input to do so, the controller may cause the smart coating to indicate where the smart coating is present or where studs, wires, or pipes are located.

With the foregoing in mind, FIG. 1 is a block diagram of a system 10 that includes a property 12. The property 12 includes a building 14. The building 14 may be a house (e.g., as depicted in FIG. 1) or any type of building (e.g., an office building, another type of residential building, a commercial building) or enclosure (e.g., garage, shed, barn, etc.). The building 14 defines an indoor space (e.g., an area inside of the building 14) and an outdoor space (e.g., an area outside of the building 14). The outdoor space may include garden or yard 16. In other embodiments, the yard 16 may be any other outdoor space included in the property 12.

The system 10 also includes one or more sensors 18, which may be utilized to detect various conditions or characteristics of the property 12 (and the building 14). The sensors 18 may include, but are not limited to, motion sensors, temperature sensors, humidity sensors, gas detection sensors, smoke detector sensors, water pressure sensors, water flow sensors, water detection sensors, leak detection sensors, wind speed sensors, air pressure sensors, electrical system sensors, structural sensors, environmental sensors, and camera (or image) sensors. Camera sensors may include, but are not limited to, visible light two-dimensional (2D) cameras, visible light three-dimensional (3D) cameras, infrared cameras, infrared 3D cameras, multi-function cameras (e.g., a single camera that captures both visible light and infrared, a camera that captures wavelengths other than infrared and visible light, and/or any combination thereof), thermal imagery cameras. The sensors 18 may be placed inside or outside of the building 14.

Motion sensors detect motion within a range of the sensor 18. Thus, motion sensors may be placed to detect when people, animals and/or objects move within a sensor's 18 field of vision. Another type of sensor may sense motion in the structure to which sensor is attached. Although structures typically do not move, in the event of an earthquake, flood, damage to that part of the structure, and/or other devastating event, a motion sensor may detect the movement of the structure itself.

Temperature sensors detect the temperature of the desired medium. Thus, temperature sensors may be configured to measure the temperature of ambient air or of a specific surface (e.g., a wall to which a temperature sensor is attached). Temperature sensors may be placed outside the structure (e.g., on an outside wall and/or the roof), inside the structure (e.g., on an interior wall, an interior ceiling, an interior floor, a basement, an attic, a kitchen, a bathroom, a bedroom, a workspace, etc.), or at a boundary there between.

Gas detection sensors detect the presence of various gasses. For instance, gas detection sensors may be configured to detect the presence of carbon monoxide (or any other harmful gasses, such as radon), oxygen, and/or methane (or any other flammable gasses). Smoke detector sensors detect the presence of smoke. The readings (e.g., data collected) by gas detection sensors, smoke detector sensors, or both may be binary (e.g., either the gas or smoke is present or not present) or quantitative (e.g., the percentage of air that includes gas or smoke, parts per million of the gas or smoke).

Water pressure sensors detect the water pressure at various locations within the building 14. Water pressure sensors may monitor water related conditions, including (but not limited to) the detection of water and water pressure detection, for instance in a plumbing system in the building 14. Water pressure sensors may have one or more probes attached to various locations of plumbing within the building 14. Thus, water pressure sensors may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Water pressure sensors may provide information related to the stresses being induced upon the plumbing system. This information may be utilized to indicate a plumbing system that is operating close to stress limits, and thus, a structure for which water damage may be more likely.

Water flow sensors detect the amount of water flowing through selected points in a plumbing system (which may include, but is not limited to, water lines, sewer lines, the HVAC system, appliances, fire suppression systems, lawn sprinklers, and sump pumps). Water flow sensors may provide information related to the amount of water being routed to the property 12, and more particularly, which parts of the building 14 are receiving exactly (or approximately) how much water. It is contemplated herein that water flow sensors may detect hot water in a water heater, hot water input pipes, cold water input pipes, and/or output pipes (e.g., pipes removing utilized water).

Water detection sensors detect any amount of water escaping through selected points throughout the plumbing system (which includes but is not limited to water lines, sewer lines, the HVAC system, appliances, fire suppression systems, lawn sprinklers, and sump pumps). Water detection sensor 90 may provide information related to water escaping and accumulating inside the structure, which parts of the structure have water accumulation and how much water. It is contemplated herein that water detection sensors 90 may detect, for exemplary purposes only and without limitation, flood waters entering from exterior to interior of the structure, water overflow from sump pump(s), drains, broken pipes, sewer back-ups, or water back-ups.

Leak detection sensors may monitor the presence of leaks from gas and water plumbing pipes both inside and outside the walls of the structure. Leak detection sensors may have one or more probes attached to various locations of the structure's plumbing and piping and may record the fact that there is a gas or water leak. Electrical system sensors detect the operational parameters of an electrical system that may be found on the property 12. Readings from sensor 90 could be used to determine if the voltage is (persistently) too high, too low, or if the voltage frequently drops and/or spikes. Other types of electrical measurements could be taken, such as readings of current flowing through the electrical system. Still other types of electrical measurements could be determined include how energy is used and at what times of day it is used.

Structural sensors may detect the (changing) conditions of a structure's elements (e.g., support beams, floors, ceilings, roofs, walls). Environmental sensors may detect various environmental conditions relating to the building 14, such as air quality or the presence of mold, bacteria, algae, lead paint, or any contaminant adverse to human health (whether airborne or attached to a portion of the building 14).

The building 14 includes walls 24 (e.g., walls 24A, 24B, 24C, 24D, 24E, 24F), which define the indoor space. In other words, the walls 24 may be exterior walls of the building 14 that have an interior side (i.e., a side of the wall 24 facing the interior of the building 14) and an exterior side (a side of the wall 24 facing the exterior of the building 14). The walls 24 may include (e.g., on the interior side of the wall 24, exterior side of the wall 24, or both) a smart coating 25, such as paint. The smart coating 25 may also be referred to as "smart paint." Generally speaking, the smart paint is a paint that is capable of carrying an electric current. For example, the smart paint may include one or more metals or metallic compounds that conduct electricity, thereby enabling electric current to be carried on the walls 24. Each of the walls 24 or portions thereof may be coated with the smart paint. In other words, walls 24 may be completely coated in the smart coating 25, or, in other cases, only some of the wall 24 may be coated in the smart coating. Indeed, as discussed below, the smart coating 25 may be applied such that the smart coating 25 may spell words or depict various shapes or patterns (e.g., when activated).

The system 10 may also include a controller 26, which may be operatively coupled to the sensors 18 as well as smart paint (e.g., attached to a wall 24 that is covered in the smart paint) may apply electric current to the walls 24. More specifically, the controller 26 may apply one or more electric currents (e.g., having the same or different voltages or amperages) to walls 24 or other surfaces coated in smart paint. When the electrical current is applied to a wall 24, the smart paint may provide indications (e.g., visual indications) or instructions regarding a condition detected to be present on the property 12 or within the building 14. Indeed, as discussed below, the controller may receive data (e.g., in the form of signals) from the sensors 18, make various determinations based on the data, and cause smart coating on one or more surfaces (e.g., walls, flooring) or the building 14 to provide an indication of the presence of a condition such as, but not limited to, a fire or leak. It should also be noted that, in some embodiments, multiple controllers 26 may be utilized (e.g., one controller 26 per wall 24).

Figure 2:
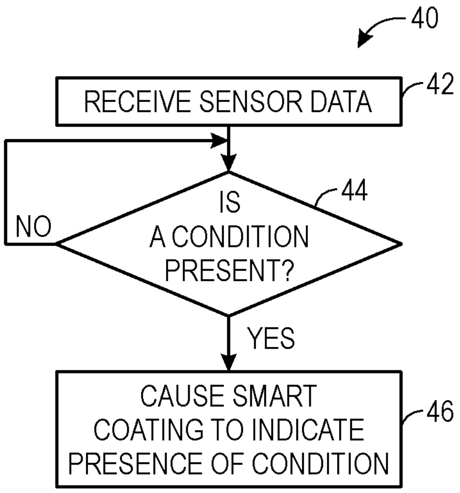
FIG. 2 is a flow diagram of a process for providing indications of one or more conditions present within the property or building of FIG. 1 using a smart coating, according to embodiments of the present disclosure.

Bearing the foregoing in mind, FIG. 2 is a flow diagram of a process 40 for providing indications of one or more conditions present within the property 12 or building 14 using the smart coating 25. The process 40 may be performed by the controller 26 by one or more processors executing executable instructions stored in a non-transitory computer-readable medium. More specifically, the process 40 may be performed by one or more processors of the controller 26 executing executable instructions stored in a non-transitory computer-readable medium.

At process block 42, the controller 26 receives data from the sensors 18. Indeed, as noted above, the sensors 18 collect data regarding various conditions or characteristics within the building 14 or property. For example, the sensors 18 may collect data regarding the presence of a gas (e.g., a gas harmful to human beings such as carbon monoxide), smoke, water or gas leaks, and several other properties noted above.

At process block 44, the controller 26 determines, based on the data received from the sensors 18, whether a condition is present. Examples of conditions include, but are not limited to, fire, smoke, carbon monoxide, water leaks, gas leaks, and flooding. As such, the conditions may include any occurrence or the presence of any quality that can be determined using the data from the sensors 18. In one embodiment, the controller 26 may determine a condition is present based upon predefined values or intensities of the sensor data. For example, the controller 26 may include memory that includes a lookup table defining various values from various types of the sensors 18 defining thresholds for each of the conditions that the controller 26 can detect. The controller 26 (e.g., using one or more processors) may access the lookup table, compare each value indicated by the sensor data to a corresponding threshold, and determine a condition is present based on the comparison to the threshold (e.g., based on a value indicated by the sensor data being above or below the threshold). In response to determining that a condition is not present, the controller 26 may receive additional data from the sensors 18. In other words, the controller 26 may perform the operations associated with process block 42 and decision block 44 repeatedly until the controller 26 determines a condition is present.

However, in response to determining a condition is present, at process block 46, the controller 26 may cause the smart coating 25 to indicate the presence of the condition(s) determined to be present. That is, the controller 26 may cause the smart coating 25 to indicate that the condition (or conditions) determined to be present is (or are) present. In particular, the controller 26 may apply electric current to the walls 24 or another surface on which the smart coating 25 is present. More specifically, the controller 26 may apply one or more electric currents (e.g., having the same or different voltages or amperages) to walls 24 or other surfaces coated in smart paint. When the electrical current is applied to a wall 24, the smart paint 25 may provide indications (e.g., visual indications) or instructions regarding a condition detected to be present on the property 12 or within the building 14. For example, the smart coating 25 may change colors or, in cases in which the smart paint 25 is generally not visible until provided with electric current), become visible. It should also be noted that prior to causing the smart coating to indicate the presence of the condition, the controller 26 may determine an appearance or manner in which the smart coating will indicate the presence of the condition based on the condition itself. In other words, the controller 26 may cause different indications to be provided for different conditions being present.

Figure 3:
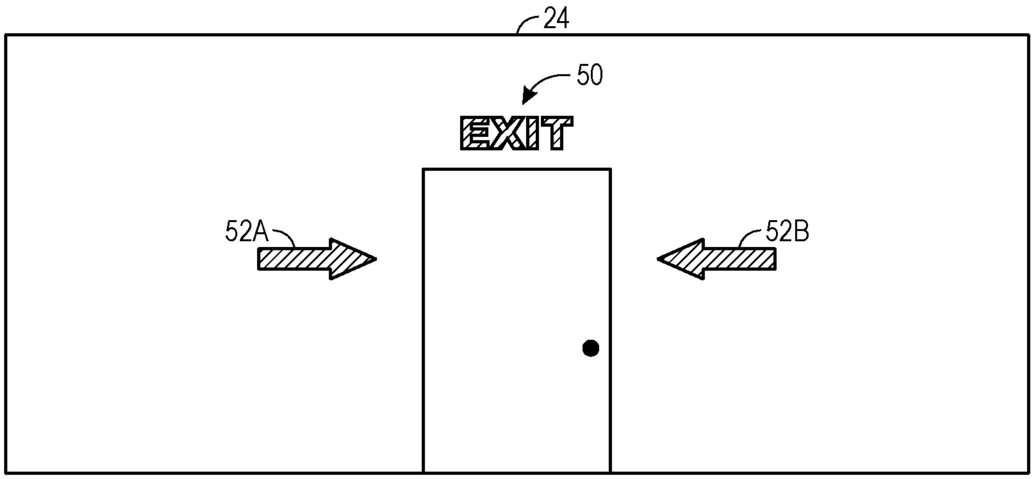
FIG. 3 is a block diagram of a wall of the building of FIG. 1 in which the smart coating indicates the location of an exit, according to embodiments of the present disclosure.
Figure 4:
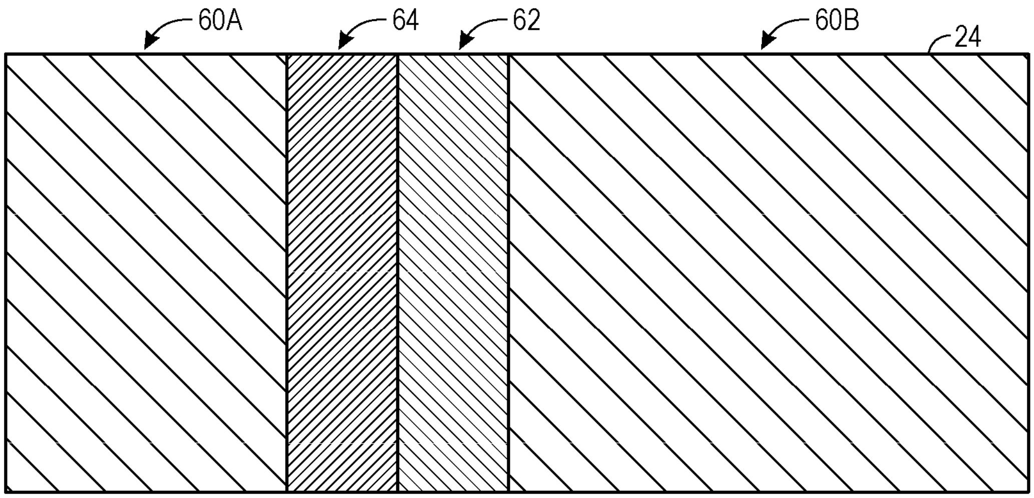
FIG. 4 is a block diagram of a wall of the building of FIG. 1 in which the smart coating indicates the relative intensities of a water leak, according to embodiments of the present disclosure.
Figure 5:
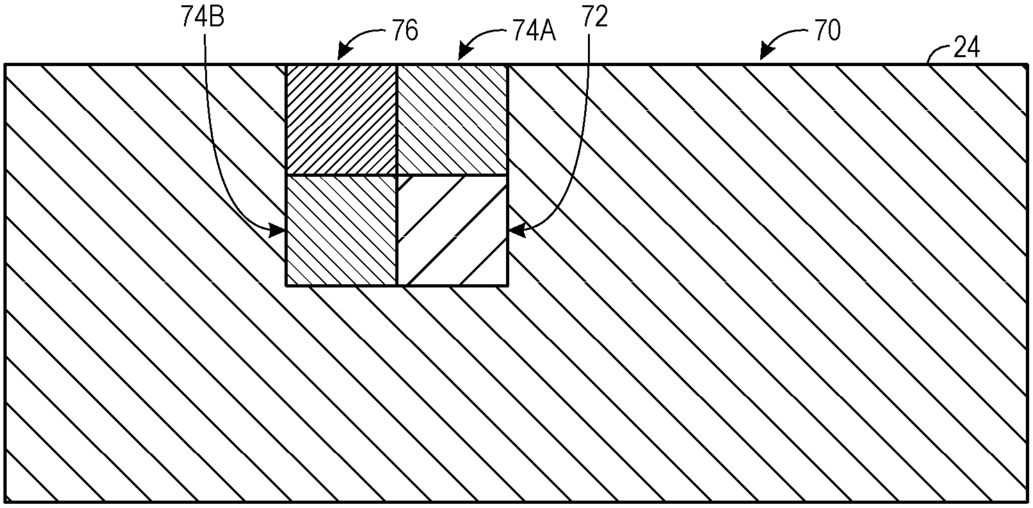
FIG. 5 is a block diagram of a wall of the building of FIG. 1 in which the smart coating indicates the relative intensities of a condition present on a wall, according to embodiments of the present disclosure.

To help illustrate, FIGS. 3-5 are provided. In particular, FIG. 3 is a block diagram of a wall 24 (e.g., of the building 14) in which the controller 26 has caused the smart paint 25 to indicate the location of an exit (e.g., a door), for example, in response to determining there is a fire, a gas leak, carbon monoxide, or another condition in which it may be suitable to evacuate present inside of the building 14. As illustrated, the smart paint may provide a first indication 50 in the form of a word (e.g., "EXIT") indicating the exit. As also illustrated, arrows 52A, 52B, which may also be formed using the smart paint 25 (e.g., by painting the shapes of the arrows 52A, 52B on the wall 24), also point towards the exit. As noted above, the smart paint 25 may become visible or change colors so that the first indication 50 and arrows 52A, 52B become visible. In other words, the first indication 50 and arrows 52A, 52B may not be visible until activated by the controller 26.

It should also be noted that, in some embodiments, before causing the smart coating 25 to indicate the presence of a condition (as discussed above with respect to process block 46) and in response to determining a condition is present (as discussed above with respect to decision block 44), the controller 26 may determine the extent or degree to which the condition is present. In such cases, the controller 26 may also cause the smart coating 26 to indicate the intensity of the presence of condition within an area or several areas. For example, FIG. 4 is a block diagram of a wall 24 (e.g., of the building 14) in which smart coating on the wall 24 indicates (as caused by the controller 26) the intensity of the presence of a condition, such as a water leak, in various location along the wall 24. For instance, the smart paint on the wall 24 may include regions 60A, 60B, which may be regions in which water is minimally present or not present. In embodiments in which the condition (e.g., water leak) is not present, the smart coating may not be visible (e.g., due to not being activated by the controller 26). The wall 24 may also include region 62 in which water is present to a greater degree than the regions 60A, 60B. Additionally, the wall 24 may include region 64 in which the water is present to a greater degree than the region 64. To show the different intensities (e.g., amounts of water present or flowing along various portions of the wall 24), the region 64 may appear differently (e.g., with a different color, brightness, or pattern) than the region 62, which may also appear differently than the regions 60A, 60B.

While FIG. 4 includes regions (e.g., regions 60A, 60B, 62, 64) that are appear as vertical stripes along the height of the wall 24, it should be noted that, in other embodiments, different patterns or portions of the wall 24 may be utilized to indicate the presence and/or intensity of the presence of a condition. For example, FIG. 5 includes square-shaped regions of smart coating that indicate the presence of a condition. In particular, region 70 may be generally similar to the regions 60A, 60B of FIG. 4 in that the region 70 may indicate that the condition is present to a minimal extent or not indicate the presence of the condition (because the condition is not present there). Region 72, regions 74A, 74B, and region 76 indicate, in increasing order, relative extents to which the condition is present at or on various portions of the wall 24. For instance, in the example of FIG. 5, the various portions (e.g., regions 70, 72, 74A, 74B, 76) may indicate a temperature (e.g., during a fire) at different locations along the wall or relative amounts of water present when there is a water leak.

Figure 6:
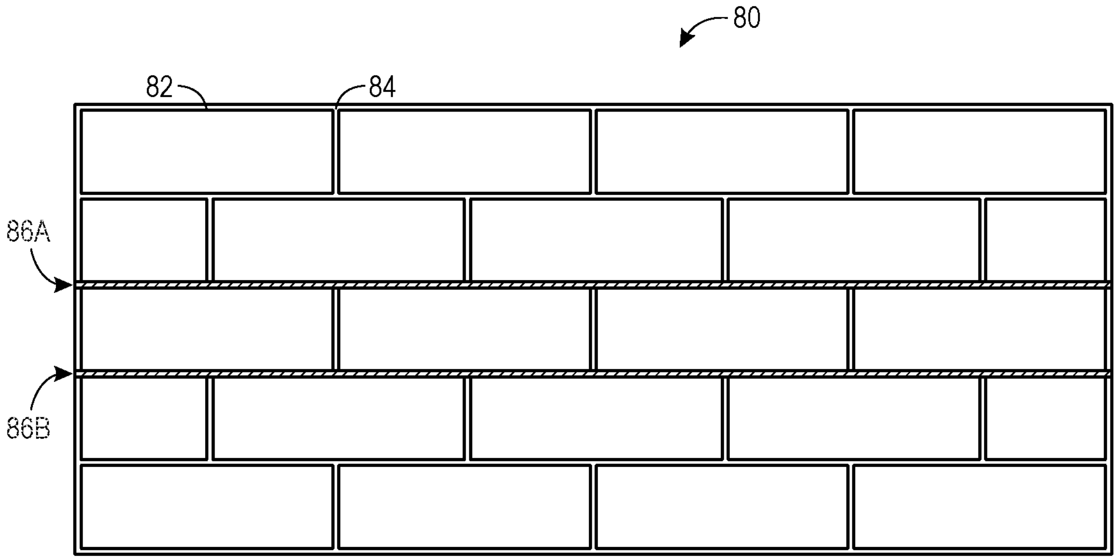
FIG. 6 is a block diagram of a tiled surface with grout that includes, or is coated with, a smart coating, according to embodiments of the present disclosure.

The controller 26 and smart coating 25 may also be utilized to provide visual indications on other surfaces. For example, FIG. 6 is a block diagram of a surface 80, which may be a wall (e.g., wall 24 of the building 14), ceiling, or floor within a structure such as the building 14. The surface 80 may include tiles 82, which may be separated from one another by grout 84. The grout may be mixed or coated with the smart paint 25, which may be operatively coupled to the controller 26. As such, the controller 26 may cause the grout, or portions thereof to provide visual indications. For example, in FIG. 6, portions 86A, 86B of the grout may be activated by the controller 26 to indicate a path (e.g., towards an exit of the building 14).

Figure 7:
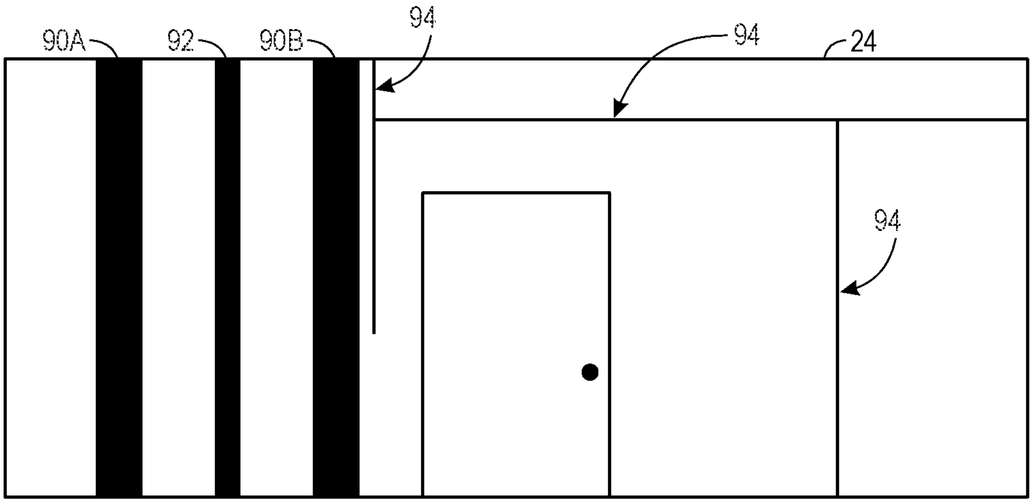
FIG. 7 is a block diagram of a wall of the building of FIG. 1 in which a display mode has been activated to indicate the locations of items inside of the wall, according to embodiments of the present disclosure.

The controller 26 may also activate (e.g., cause an indication to be provided by) the smart coating 25 for other applications. For example, FIG. 7 illustrates a wall (e.g., of the building 12) after a "display mode" has been activated. The display mode may be activated by a user utilized an electronic device (e.g., phone, tablet, computer, wearable device, or another computing device) that may be communicatively coupled to the controller 26 (e.g., utilizing a wired or wireless connection). For instance, a user may utilize an electronic device to access an application that enables the user to interact with the controller 26 to cause the display mode to be entered.

In the display mode, indications of the locations of several different items behind or inside the wall 24 may be provided. For example, the controller 26 may cause the smart paint on the wall 24 to indicate the locations of studs 90A, 90B, a pipe 92, and wiring 94, which may aid the user when performing repairs, placing a hole in the wall 24, or performing some other task in the building 14. In other embodiments, in the viewing mode, the location(s) of smart coating on the wall 25 may also be indicated. For example, while utilizing the application to access the controller 26, the user may select display settings to choose what will be indicated in the display mode or where (e.g., which wall 24) the display mode will be activated. Accordingly, the controller 26 may cause smart coating present on the wall(s) 24 to become activated in response to user input indicating where the display mode should be present.

Accordingly, the techniques disclosed in the present application enable occupants of a building to be notified of the presence of one or more conditions within the building. For example, as discussed above, a controller may utilize sensor data to detect the presence of various conditions, such as, but not limited to, fires, carbon monoxide, gas leaks, water leaks. When such a condition is determined to be present, the controller may cause a smart coating to provide an indication that the condition is present, thereby enabling the occupants to know of, and react to, the presence of the condition.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a building comprising a wall at least partially covered in a smart paint;
a sensor configured to collect sensor data regarding a condition within the building, wherein the condition comprises a fire, a presence of carbon monoxide, a water leak, or a gas leak; and
a controller operatively coupled to the smart paint and the sensor, wherein the controller is configured to:
receive the sensor data from the sensor;
determine whether the condition is present based on the sensor data; and
in response to determining the condition is present, cause the smart paint to provide an indication that the condition is present.

2. The system of claim 1, visual indication comprises text, one or more symbols, or both.

3. The system of claim 1, wherein:
the condition comprises the fire, the presence of carbon monoxide, or the gas leak; and
the indication indicates the location of an exit of the building.

4. The system of claim 1, wherein:
the condition comprises the water leak; and
the indication indicates a plurality of intensities of the water leak along different portions of the wall.

5. The system of claim 1, wherein the sensor comprises, a motion sensor, a temperature sensor, a humidity sensor, a water pressure sensor, a water flow sensor, a water detection sensor, an electrical system sensor, a structural sensor, an environmental sensor, or a camera sensor.

6. The system of claim 1, wherein the sensor comprises a gas detection sensor, a smoke detector sensor, or a leak detection sensor.

7. The system of claim 1, wherein the controller is configured to determine the indication based on the condition.

8. The system of claim 1, wherein the controller is configured to:
receive a request from an electronic device to activate a display mode; and
in response to receiving the request to activate the display mode, cause the smart paint to provide a second indication, the second indication being indicative of:
each location on the wall on which the smart paint is present; and
a location of a stud of the wall, a pipe in the wall, electrical wiring in the wall, or any combination thereof.

9. The system of claim 8, wherein the second indication is indicative of each location on the wall on which the smart paint is present.

10. The system of claim 8, wherein the second indication is indicative of the location of the stud and the pipe, the stud and the electrical wiring, or the pipe and the electrical wiring.

11. A computer-implemented method, comprising:
receiving, via processing circuitry, sensor data regarding a condition within a building from a sensor, wherein the condition comprises a fire, a presence of carbon monoxide, a water leak, or a gas leak;
determining, via the processing circuitry and based on the sensor data, that the condition is present; and
in response to determining the condition is present, causing, via the processing circuitry, smart paint that at least partially covers a wall of the building to provide an indication that the condition is present.

12. The computer-implemented method of claim 11, wherein causing the smart paint to provide the indication comprises causing an electrical current to pass through the smart paint.

13. The computer-implemented method of claim 11, wherein the processing circuitry is disposed within a controller configurable to be located within the building.

14. The computer-implemented method of claim 11, wherein the indication is indicative of a degree to which the condition is present.

15. The computer-implemented method of claim 11, further comprising:
receiving a request from an electronic device to activate a display mode; and
in response to receiving the request to activate the display mode, cause the smart paint to provide a second indication, the second indication being indicative of each location on the wall on which the smart paint is present, a location of a stud of the wall, a location of a pipe in the wall, a location of electrical wiring in the wall, or any combination thereof.

16. A tangible, non-transitory computer-readable medium comprising instructions that, when executed by processing circuitry, cause the processing circuitry to:
receive, from a sensor, sensor data regarding a condition within a building, wherein the condition comprises a fire, a presence of carbon monoxide, a water leak, or a gas leak;
determine, based on the sensor data, whether the condition is present; and in response to determining the condition is present, cause smart paint that at least partially covers a surface of the building to provide an indication that the condition is present.

17. The tangible, non-transitory computer-readable medium of claim 16, wherein the surface is an interior wall of the building.

18. The tangible, non-transitory computer-readable medium of claim 16, wherein the surface is grout located on a floor or a wall of the building.

19. The tangible, non-transitory computer-readable medium of claim 18, wherein the grout is located on the floor of the building.

20. The tangible, non-transitory computer-readable medium of claim 16, wherein the surface comprises a ceiling of the building.

* * * * *